United States Patent
Chen et al.

(10) Patent No.: US 12,227,423 B2
(45) Date of Patent: Feb. 18, 2025

(54) SILICON-ALUMINUM ALLOY AND PREPARATION METHOD THEREFOR

(71) Applicant: SHENZHEN SUNXING LIGHT ALLOYS MATERIALS CO., LTD., Guangdong (CN)

(72) Inventors: Xuemin Chen, Guangdong (CN); Ronald Ray Duckworth, Guangdong (CN); Yueming Yu, Guangdong (CN); Qingchao Wang, Guangdong (CN); Zhi Zhou, Guangdong (CN)

(73) Assignee: SHENZHEN SUNXING LIGHT ALLOYS MATERIALS CO., LTD., Guangdong (CN)

( * ) Notice: Subject to any disclaimer, the term of this patent is extended or adjusted under 35 U.S.C. 154(b) by 250 days.

(21) Appl. No.: 17/802,970

(22) PCT Filed: May 28, 2020

(86) PCT No.: PCT/CN2020/092956
§ 371 (c)(1),
(2) Date: Nov. 28, 2022

(87) PCT Pub. No.: WO2021/169073
PCT Pub. Date: Sep. 2, 2021

(65) Prior Publication Data
US 2023/0094357 A1    Mar. 30, 2023

(30) Foreign Application Priority Data
Feb. 28, 2020  (CN) .......................... 202010131433.6

(51) Int. Cl.
*C01B 33/02* (2006.01)
*C01B 33/021* (2006.01)
(Continued)

(52) U.S. Cl.
CPC ............ *C01B 33/02* (2013.01); *C01B 33/021* (2013.01); *C22C 1/047* (2023.01); *C22C 21/02* (2013.01); *C22C 21/04* (2013.01)

(58) Field of Classification Search
CPC ....... C22C 1/0441; C22C 1/047; C22C 21/02; C22C 21/04; C01B 33/02; C01B 33/04
See application file for complete search history.

(56) References Cited

U.S. PATENT DOCUMENTS 3,765,878 A * 10/1973 Bullough ................ C22C 21/02
                                                                    420/548
8,900,341 B2 * 12/2014 Dosaj ...................... C22C 21/02
                                                                    75/684
2014/0233119 A1    8/2014 Kreling et al.

FOREIGN PATENT DOCUMENTS

CN    1393572    1/2003
CN    1605648    4/2005
(Continued)

OTHER PUBLICATIONS

English translation of Written Opinion of PCT/CN2020/092956, Aug. 28, 2022 (Year: 2022).*
(Continued)

*Primary Examiner* — Timothy Kennedy
(74) *Attorney, Agent, or Firm* — JCIPRNET

(57) ABSTRACT

Disclosed are a silicon-aluminum alloy and its preparation method. The method comprises: adding aluminum metal or molten aluminum into a container, wherein the temperature of the molten aluminum is between 700° C. and 800° C.; adding a semi-metallic silicon raw material to the molten aluminum, closing a furnace cover, carrying out vacuumization, and introducing argon, to ensure that the interior of a magnetic induction furnace is in a positive-pressure state, and stirring the aluminum metal or molten aluminum with a graphite stirring head; powering on and heating so that the
(Continued)

aluminum metal or molten aluminum is heated to 1000° C. or above and molten, and holding the temperature between 1000° C. and 1500° C.; and after alloying is completed, cooling the molten aluminum to 1000° C. or below, opening the furnace cover, pouring the silicon-aluminum alloy into a corresponding mold, and cooling for molding.

6 Claims, 9 Drawing Sheets

(51) Int. Cl.
*C22C 1/047* (2023.01)
*C22C 21/02* (2006.01)
*C22C 21/04* (2006.01)

(56) References Cited

FOREIGN PATENT DOCUMENTS

| CN | 101403088 | | 4/2009 | |
| CN | 101509089 | | 8/2009 | |
| CN | 102618738 | | 8/2012 | |
| CN | 102876910 | A * | 1/2013 | |
| CN | 104388769 | | 3/2015 | |
| CN | 106148744 | | 11/2016 | |
| CN | 109439974 | | 3/2019 | |
| CN | 110423922 | | 11/2019 | |
| DE | 19800425 | | 7/1999 | |
| EP | 1284303 | A1 * | 2/2003 | ......... C23C 14/3414 |
| JP | H11140579 | | 5/1999 | |
| TW | 201228749 | | 7/2012 | |

OTHER PUBLICATIONS

Machine translation of EP 1284303, retrieved from USPTO database Oct. 17, 2024 (Year: 2024).*
Machine translation of CN 102876910, retrieved from USPTO database Oct. 17, 2024 (Year: 2024).*
Machine translation of CN 109439974, retrieved from USPTO database Oct. 17, 2024 (Year: 2024).*
"International Search Report (Form PCT/ISA/210) of PCT/CN2020/092956", mailed on Dec. 1, 2020, with English translation thereof, pp. 1-5.

* cited by examiner

SILICON-ALUMINUM ALLOY AND PREPARATION METHOD THEREFOR

CROSS-REFERENCE TO RELATED APPLICATION

This application is a 371 of international application of PCT application serial no. PCT/CN2020/092956, filed on May 28, 2020, which claims the priority benefit of China application no. 202010131433.6, filed on Feb. 28, 2020. The entirety of each of the above mentioned patent applications is hereby incorporated by reference herein and made a part of this specification.

BACKGROUND OF THE INVENTION

1. Technical Field

The invention relates to the technical field of silicon-aluminum alloys and preparation thereof, and in particular to a silicon-aluminum alloy and its preparation method.

2. Description of Related Art

During the production and processing of aluminum alloy materials (such as aluminum plates for aviation, aluminum plates for cans, aluminum plates for PS plate bases, or various types of aluminum profiles or aluminum castings, etc.), it is usually required to add semi-metallic silicon element to a molten aluminum melt (having a temperature generally controlled between 740° C. and 750° C.), so that the semi-metallic silicon and aluminum form a uniformly dispersed intermetallic compounds (i.e., aluminum-silicon alloys), so as to significantly improve the strength and other physical property indicators of the aluminum product. However, since the melting point of metal silicon is 1246° C., and the melting temperature of an aluminum melt is generally controlled between 740° C. and 750° C., in order to rapidly melt and blend metal silicon into the aluminum melt and make the metal silicon and aluminum form intermetallic compounds (aluminum-silicon intermetallic compounds), at present, there are mainly the following methods available.

A first method is to add a calculated amount of silicon element additive to an aluminum melt. This silicon element additive, commonly known as soluble silicon, is made by thoroughly mixing, by a physical method, mechanically broken silicon powder or shaped silicon particles and mechanically broken potassium fluoroaluminate ($KAlF_4$, commonly known as PAF) together (the silicon content is generally controlled at 95% or lower, and the balance is KALF4). The silicon element additive is added into the molten metal aluminum. Under the fluxing action of PAF, the metal silicon can be rapidly melted and bend into molten aluminum and form intermetallic compounds (alloys) with aluminum. However, since the main component of PAF contains fluorine (F), it causes environmental pollution due to the volatilization and cleaning (refining) of fluorine (F) in the production process. There are also two defects in the use of this soluble silicon in the production of aluminum products: 1. It cannot guarantee that silicon and aluminum are completely alloyed to form intermetallic compounds (because the melting temperature in the production process of aluminum products is generally controlled at 800° C. or below), resulting in that bright crystals (silicon) are produced on the surface of the aluminum products after the production of aluminum products due to the fact that part of the silicon is in an elemental state. 2. Since the calcium content in the raw material silicon is relatively high and the melting point of metal calcium is too low, slow-setting areas may appear and cause roll coating in the rolling process of an aluminum plate (one of the varieties of aluminum products).

A second method is to add a calculated amount of a silicon additive (an aluminum-silicon alloy, where the silicon content is controlled between 10% and 20%, and the balance is aluminum) to an aluminum melt. The commonly used specifications of the currently popular silicon additives are AlSi10, AlSi12 and AlSi20, and their silicon contents are between 10% and 20% and the balance is aluminum. The silicon content of AlSi10 is 10%, and the balance is aluminum; the silicon content of AlSi12 is 12%, and the balance is aluminum; the silicon content of AlSi15 is 15%, and the balance is aluminum; the silicon content of AlSi20 is 20%, and the balance is aluminum. As an additive of silicon element in the production process of aluminum products, the production temperatures of AlSi10 to AlSi20 are controlled between 700° C. and 1000° C. in the production process where aluminum is molten at a temperature between 700° C. and 800° C., the calculated amount of elemental silicon and flux PAF are then added, and the molten aluminum is heated to a maximum of about 1000° C. The aluminum-silicon alloys produced in this way have the following defects: 1. Most of the elemental silicon is dispersed in the aluminum-silicon alloys in a dissolved form, and does not form or completely form intermetallic compounds with aluminum. 2. The phenomenon of hypo-eutectic silicon phases may occur. This hypo-eutectic silicon phases are hereditary and can exist in the downstream aluminum product production process and is uniformly dispersed in the aluminum products. The existence of the hypo-eutectic silicon phases will cause unpredictable coarse grains during the production of aluminum products. In addition, the silicon element additive used in the production of AlSi10 to AlSi20 (the silicon content is within a range of 10% to 20%, and the balance is aluminum) has a defect of high calcium element content in the production process. The existence of this defect will cause an aluminum product produced subsequently to become black due to surface oxidation and lead to irregular pinholes inside the aluminum product or black spots due to local surface oxidation. It may also causes another situation is the phenomenon of roll coating during the production and rolling of aluminum plates.

BRIEF SUMMARY OF THE INVENTION

The main objective of the invention is to provide a silicon-aluminum alloy and its preparation method and is intended to achieve the prior full alloying of silicon and aluminum in the silicon-aluminum alloy and overcome the appearance of hypo-eutectic silicon phases that may be produced during silicon-aluminum alloy production.

In order to achieve the above objective, the invention provides a silicon-aluminum alloy. The silicon-aluminum alloy is composed of metal silicon and aluminum and includes, by weight, 55% to 90% of silicon and the balance of aluminum and impurities.

The silicon-aluminum alloy is an intermetallic compound formed by metal silicon and metal aluminum at a high temperature.

The silicon-aluminum alloy can be amorphous blocks, flakes or powder. Regardless of blocks, flakes or powder, their specifications can be restricted by formulating corresponding standards.

In order to achieve the above objective, the invention further provides a preparation method of a silicon-aluminum alloy. The method includes the following steps:

Step S1, adding metal aluminum or molten aluminum into a container, wherein the temperature of the molten aluminum is between 700° C. and 800° C.;

Step S2, adding a metal silicon raw material (silicon flakes, silicon blocks or silicon powder or a mixture of silicon flakes, silicon blocks and silicon powder) into the molten aluminum, closing a furnace cover, carrying out vacuumization and introducing argon to ensure that the interior of a magnetic induction furnace is in a positive-pressure state, and stirring the mixture with a graphite stirring head;

Step S3, powering on and heating so that the aluminum metal or molten aluminum is heated to 1000° C. or above and molten, and holding the temperature between 1000° C. and 1500° C.; stirring with the graphite stirring head for 30 min to 2 h; powering off, cooling to a temperature between 800° C. and 900° C. and holding at this temperature constantly for 30 min and then heating up to a temperature between 1000° C. and 1500° C.; and stirring with the graphite stirring head for 30 min to 1 h; and Step S4, after alloying is completed, cooling to 1000° C. and casting into ingots or flakes or crushed into powdered materials as required. The proportion of unalloyed elemental silicon in the silicon-aluminum alloy formed by this two-step heating process shows a significant downward trend, and the absorption rate of silicon in the molten aluminum of the silicon-aluminum alloy in the processing process of the aluminum product shows a rapid growth trend.

As a further technical solution of the invention, the container is a crucible placed in a vacuum magnetic induction furnace, or a crucible placed in a vacuum resistance furnace, or a non-vacuum heating container with a protective flux.

As a further technical solution of the invention, a frequency of the induction furnace ranges from 800 Hz to 1200 Hz.

As a further technical solution of the invention, the metal silicon raw material is silicon powder, silicon flakes or amorphous silicon blocks, or a mixture of silicon powder, silicon flakes and amorphous silicon blocks.

As a further technical solution of the invention, in Step S3, the time of stirring with the graphite stirring head is within a range of 30 min to 2 h, and then power is turned off, the mixture is cooled to a temperature between 800° C. and 900° C. and held constantly for 30 min and then heated up to a temperature between 1000° C. and 1500° C., and stirred with the graphite stirring head for 30 min to 1 h.

As a further technical solution of the invention, the production method of the silicon-aluminum alloy includes but is not limited to a production process using a vacuum magnetic induction furnace, a production process using crucibles lined with different materials in a vacuum resistance furnace, and other heating production processes where in a non-vacuum way, a suitable protective flux is selected to isolate the air.

As a further technical solution of the invention, subsequent to Step S4, the method further includes:

casting the silicon-aluminum alloy into various types of blocks or flakes or crushing the same into powders with different diameters as required, and adding the silicon-aluminum alloy as a silicon element additive to a smelting and preparation process of an aluminum alloy material to improve the strength and other physical property indicators of the manufactured aluminum.

The beneficial effects of the silicon-aluminum alloy of the invention and its preparation method are as follows.

Compared with the prior art, the invention achieves the prior full alloying of the majority of silicon and aluminum in the silicon-aluminum alloy and overcomes the appearance of hypo-eutectic silicon phases that may be produced during the production of the silicon-aluminum alloy with a silicon content of 10% to 20%. Moreover, the content of impurity calcium in this silicon-aluminum alloy is very low or almost zero. It avoids various defects caused by the presence of calcium entering the aluminum melt after the processing of the finished aluminum product.

DETAILED DESCRIPTION OF THE INVENTION

It should be understood that the preferred embodiments described here are only for explaining the invention rather than limiting it.

In order to achieve full alloying of silicon and aluminum in silicon-aluminum alloys, improve the silicon absorption rate and absorption speed of silicon-aluminum alloy additives in the processing of silicon-aluminum alloy profiles, and reduce environmental pollution, the invention provides a silicon-aluminum alloy. The silicon-aluminum alloy is composed of aluminum and silicon and includes, by weight, 55% to 90% of silicon and the balance of aluminum and impurities.

The weight percentage of the silicon can be, for example, 55%, 60%, 65%, 70%, 75%, 80%, 85%, and 90%, and the corresponding silicon-aluminum alloy can be expressed as AlSi55, AlSi60, AlSi65, AlSi70, AlSi75, AlSi80, AlSi85, and AlSi90.

It can be understood that the silicon-aluminum alloy of the invention is mainly used as an additive of elemental silicon in the production process of aluminum alloy products. It should be specially pointed out that the impurities of this silicon-aluminum alloy product should be limited, for example, the content of iron or manganese should not be greater than 0.5%, the content of calcium should be less than 0.02%, the combined amount of alumina and manganese oxide should not be greater than 0.5%, etc.

The silicon-aluminum alloy is an intermetallic compound formed by metal silicon and metal aluminum at a high temperature.

The silicon-aluminum alloy can be amorphous blocks, flakes or powder. Regardless of blocks, flakes or powder, their specifications can be restricted by formulating corresponding standards.

In this embodiment, when metal silicon and metal aluminum are molten at a high temperature, the intermetallic compound Al9Si and elemental Si are formed. FIGS. 1 to 16 should be referred to for the phase diagrams of silicon-aluminum. FIGS. 11 to 16 are the metallographic structure diagrams of aluminum products produced by adding various types of silicon-aluminum alloy additives (including pure elemental silicon, AlSi10, AlSi55, AlSi60, AlSi65, AlSi70, and AlSi75) to 750° C. molten aluminum and controlling the Si content accurately at 10%, and thoroughly stirring the mixture for 20 min to fully absorb the additives. Referring to FIGS. 1 to 10 comparing the diffraction pattern at the time of primary heating with the diffraction pattern at the time of secondary heating, it can be seen that the peak value of elemental silicon in the silicon-aluminum alloy produced by the secondary heating process is significantly lower than that of the primary heating process.

Figure 1:
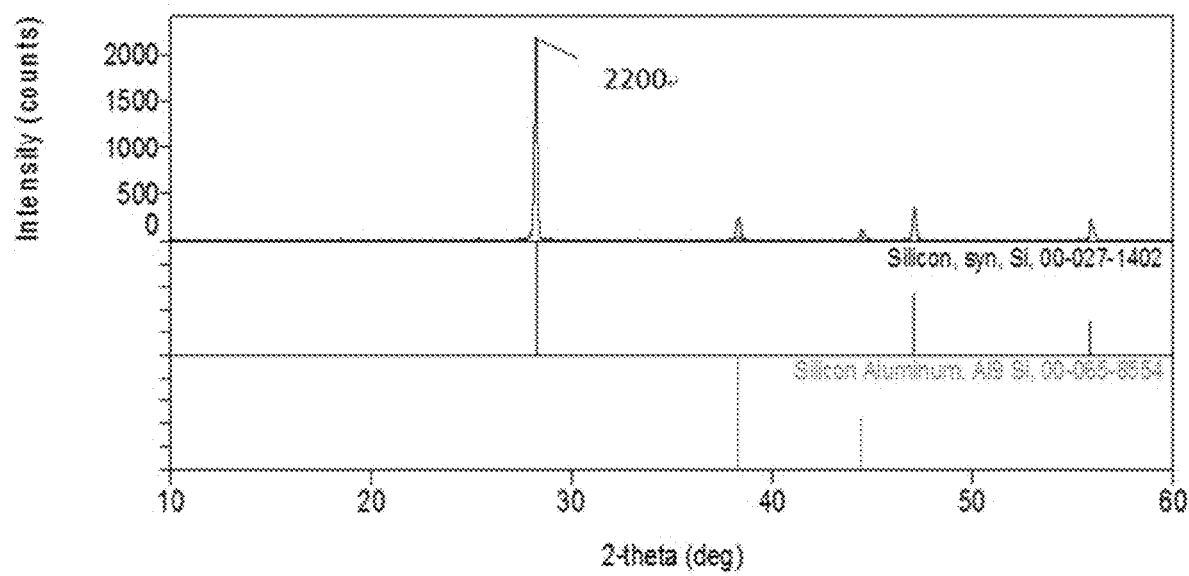
FIG. 1 is a diffraction pattern of AlSi55 at the time of primary heating, where the main phases are Si and Al9Si.
Figure 2:
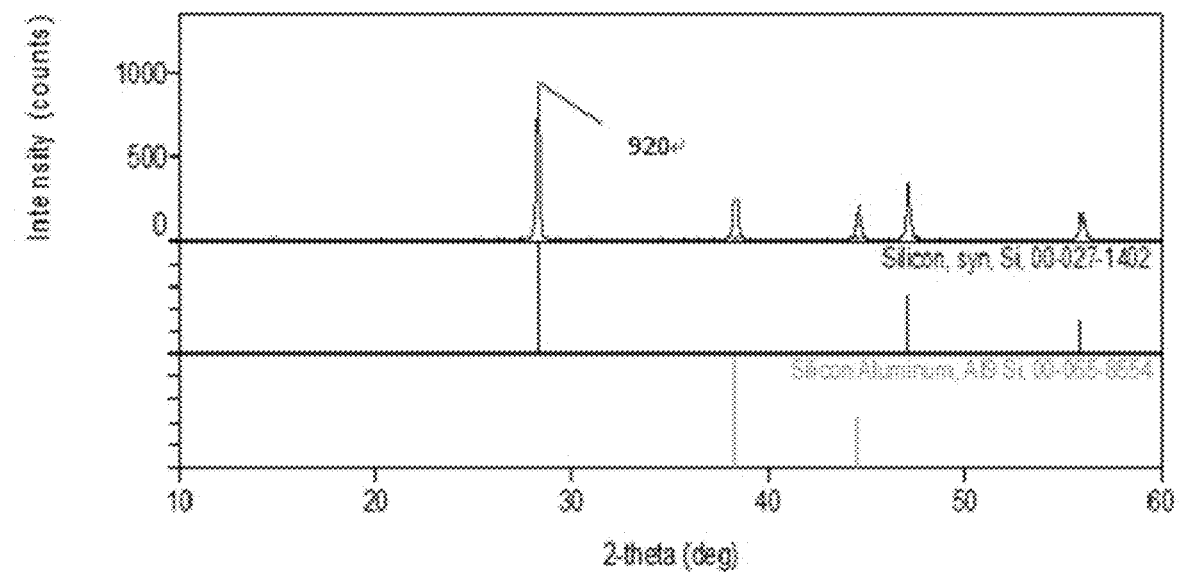
FIG. 2 is a diffraction pattern of AlSi55 at the time of secondary heating, where the main phases are Si and Al9Si.
Figure 3:
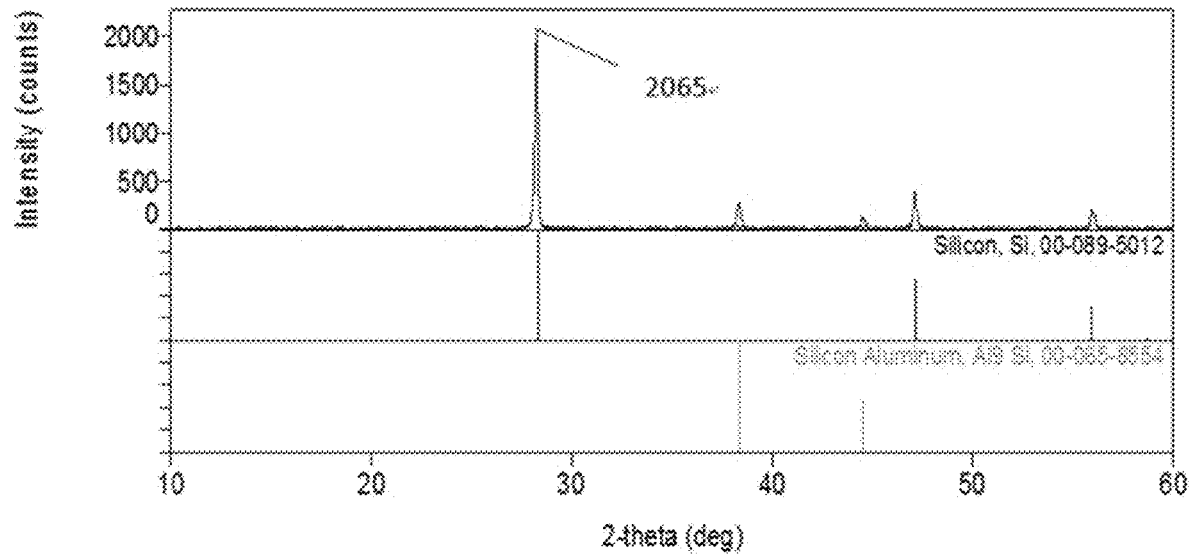
FIG. 3 is a diffraction pattern of AlSi60 at the time of primary heating, where the main phases are Si and Al9Si.
Figure 4:
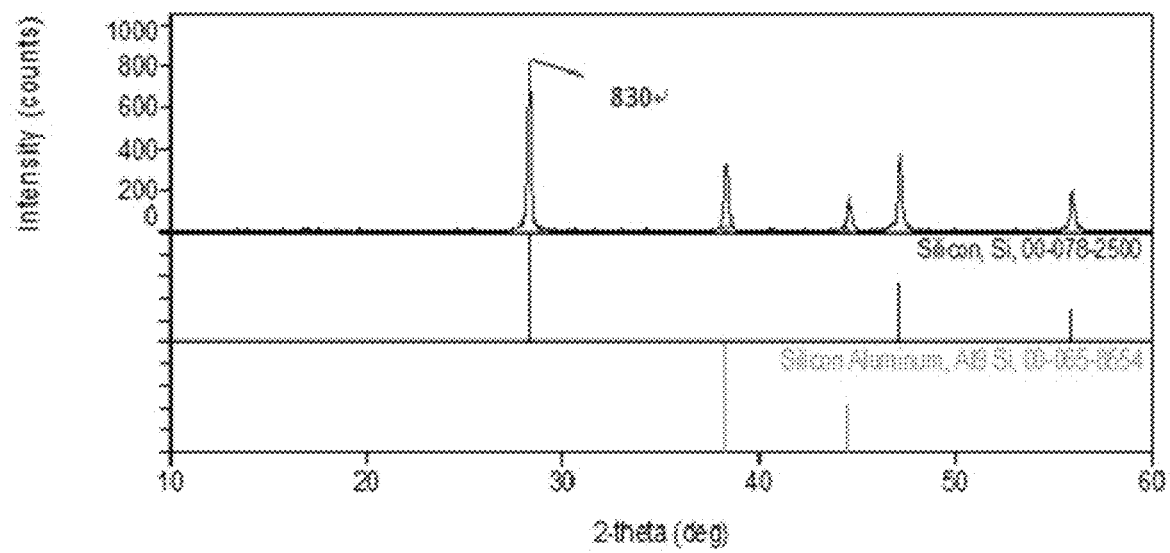
FIG. 4 is a diffraction pattern of AlSi60 at the time of secondary heating, where the main phases are Si and Al9Si.
Figure 5:
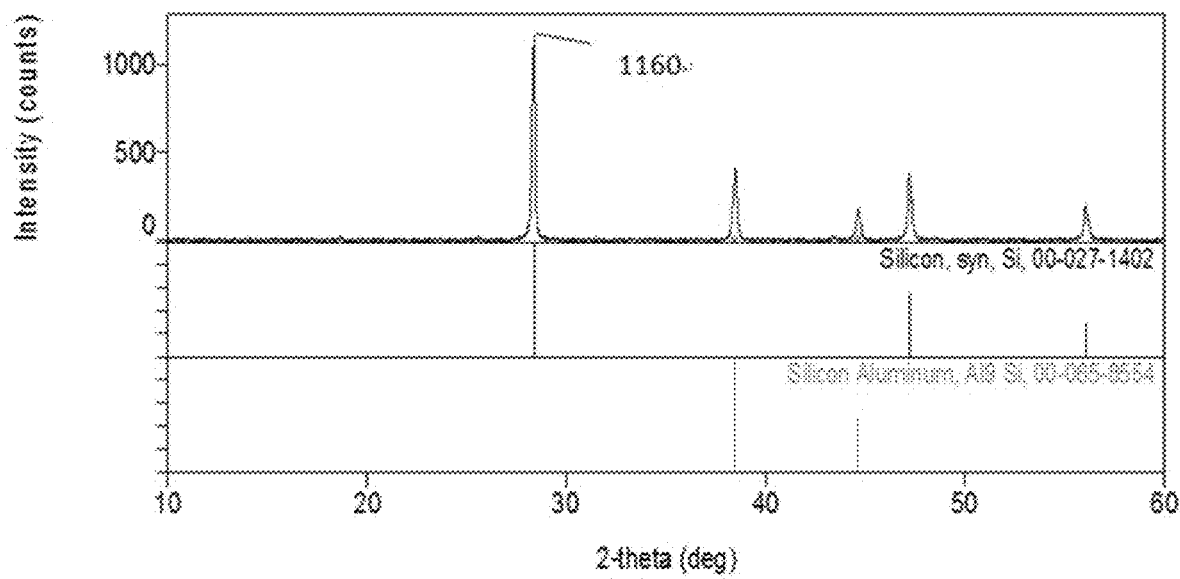
FIG. 5 is a diffraction pattern of AlSi65 at the time of primary heating, where the main phases are Si and Al9Si.
Figure 6:
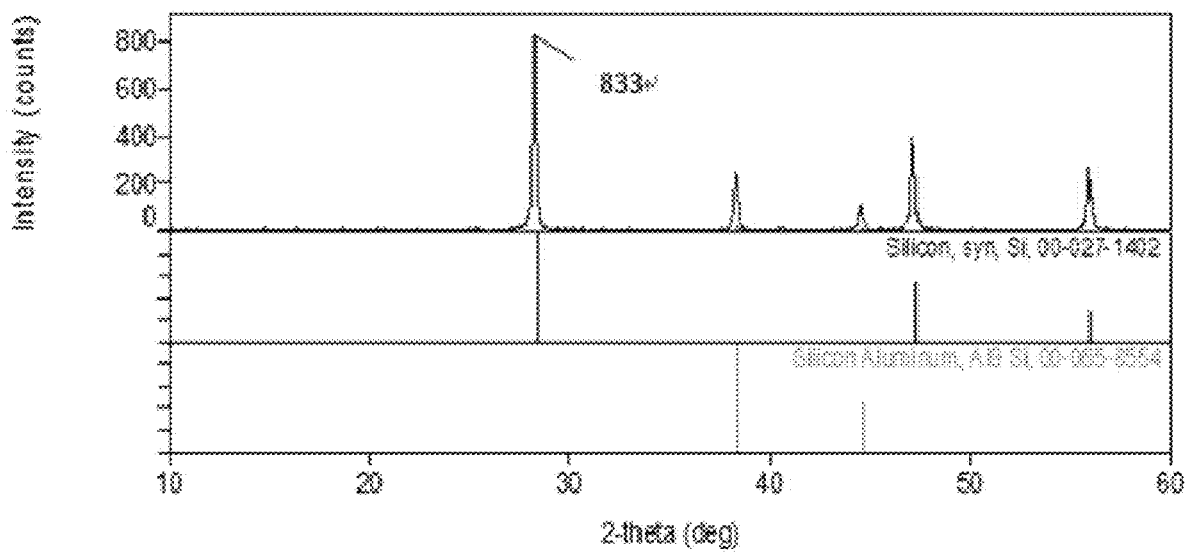
FIG. 6 is a diffraction pattern of AlSi65 at the time of secondary heating, where the main phases are Si and Al9Si.
Figure 7:
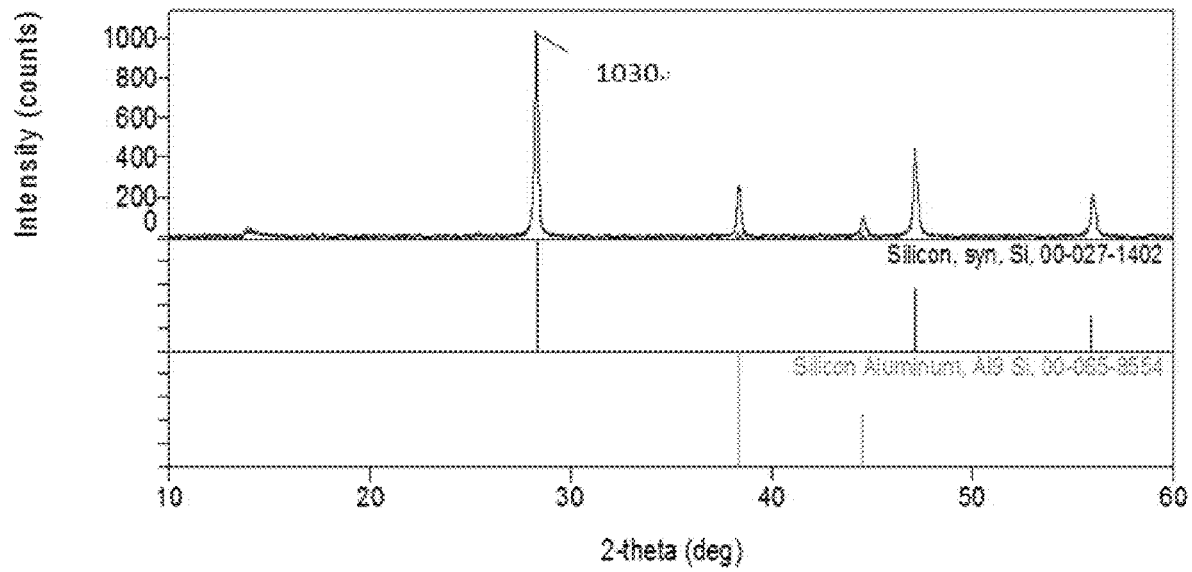
FIG. 7 is a diffraction pattern of AlSi70 at the time of primary heating, where the main phases are Si and Al9Si.
Figure 8:
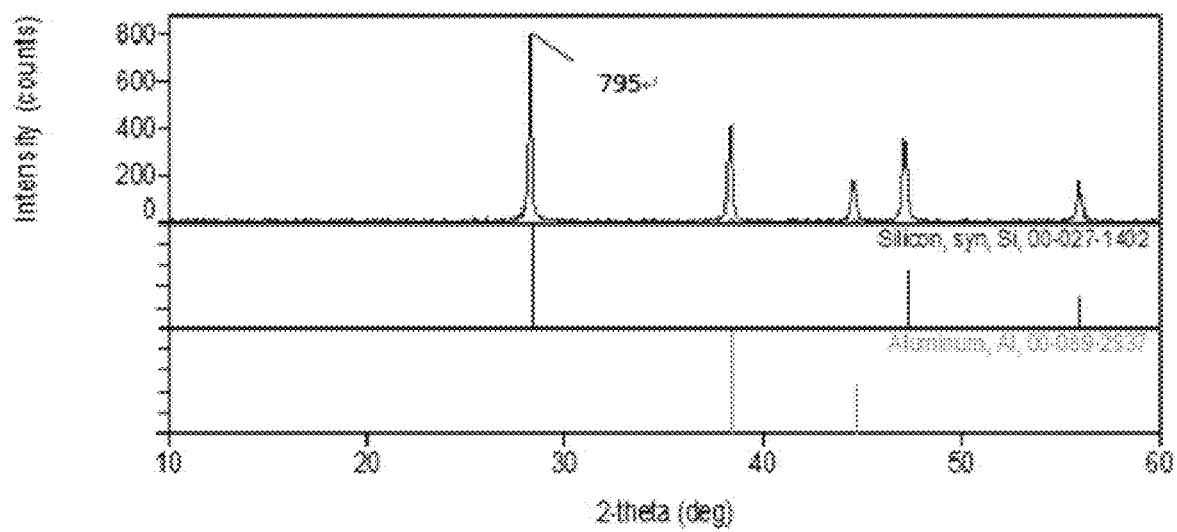
FIG. 8 is a diffraction pattern of AlSi70 at the time of secondary heating, where the main phases are Si and Al9Si.
Figure 9:
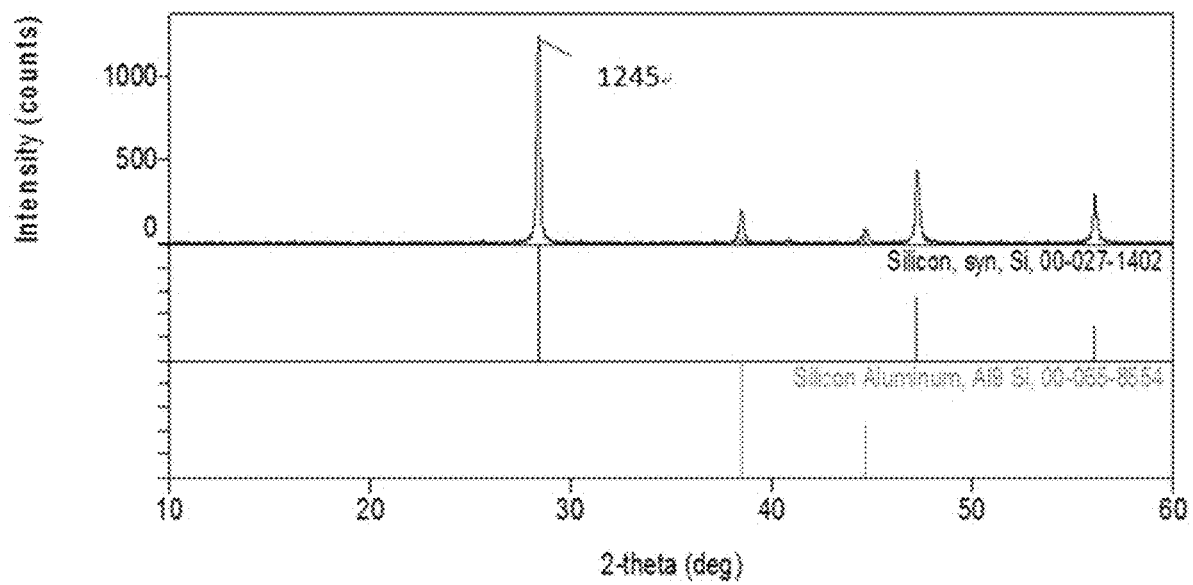
FIG. 9 is a diffraction pattern of AlSi75 at the time of primary heating, where the main phases are Si and Al9Si.
Figure 10:
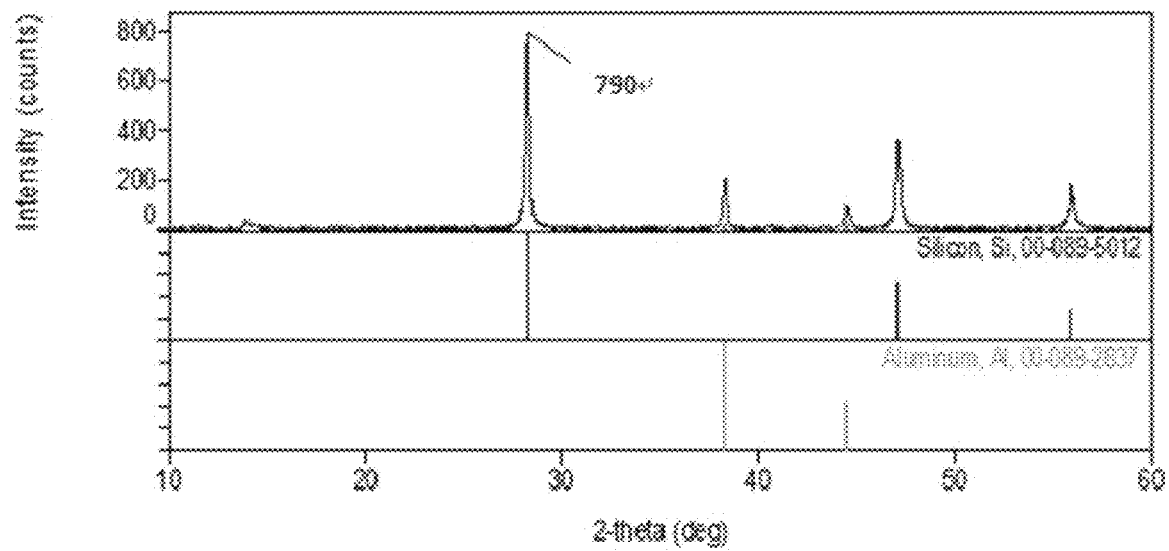
FIG. 10 is a diffraction pattern of AlSi75 at the time of secondary heating, where the main phases are Si and Al9Si.
Figure 11:
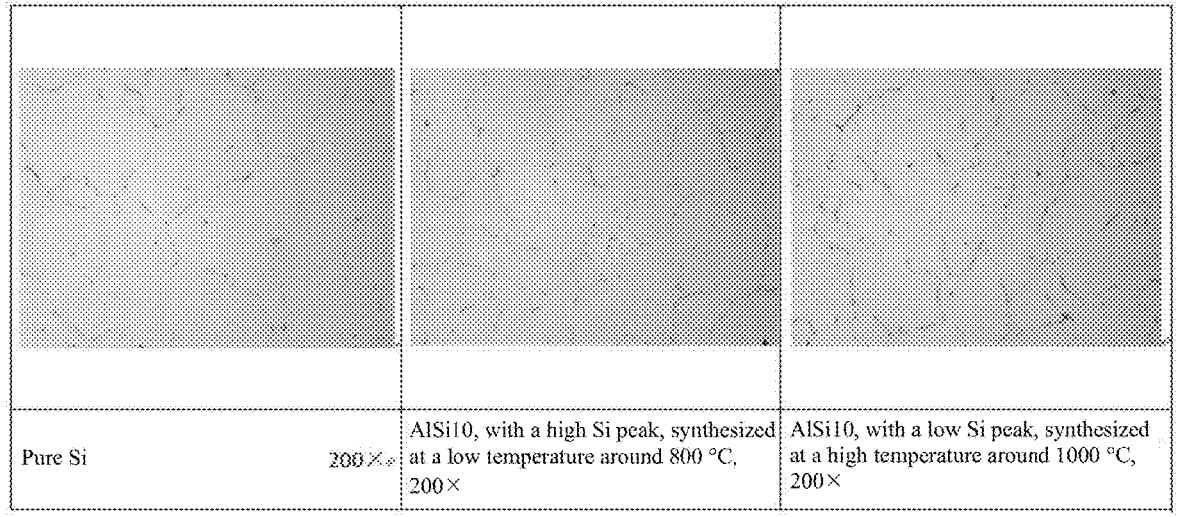
FIG. 11 is a metallographic diagram of AlSi10.
Figure 12:
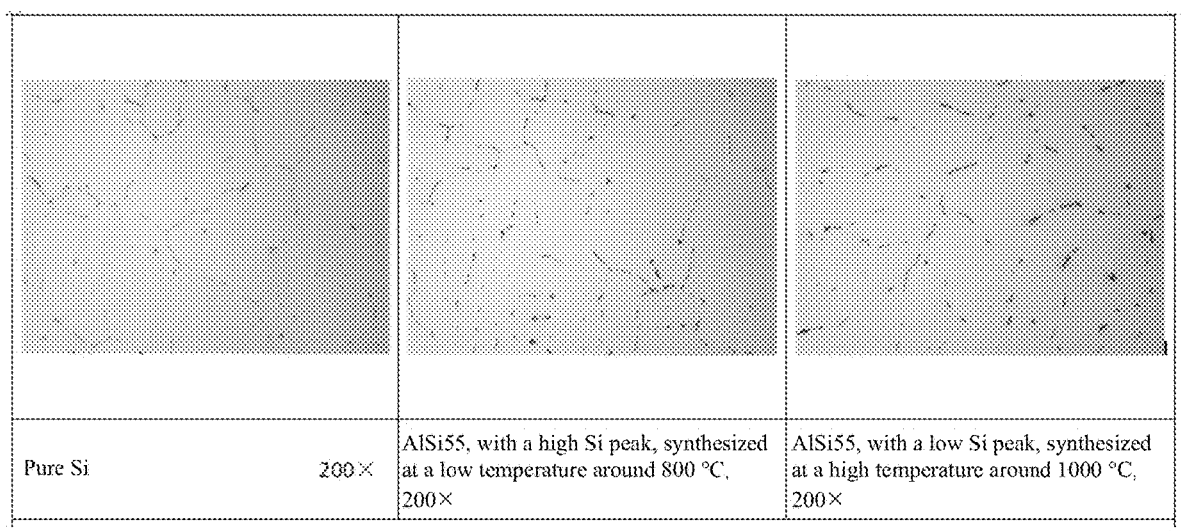
FIG. 12 is a metallographic diagram of AlSi55.
Figure 13:
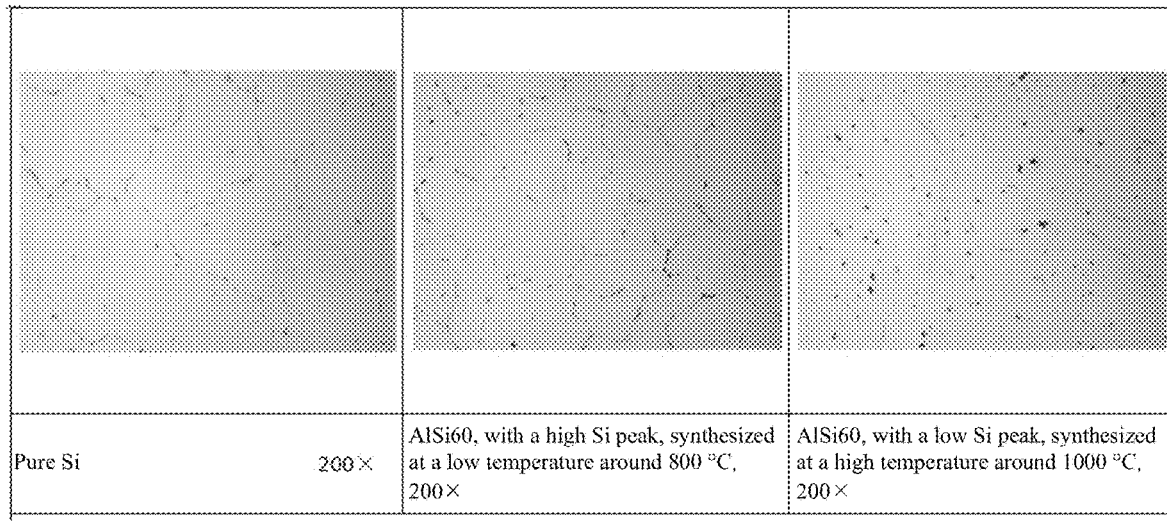
FIG. 13 is a metallographic diagram of AlSi60.
Figure 14:
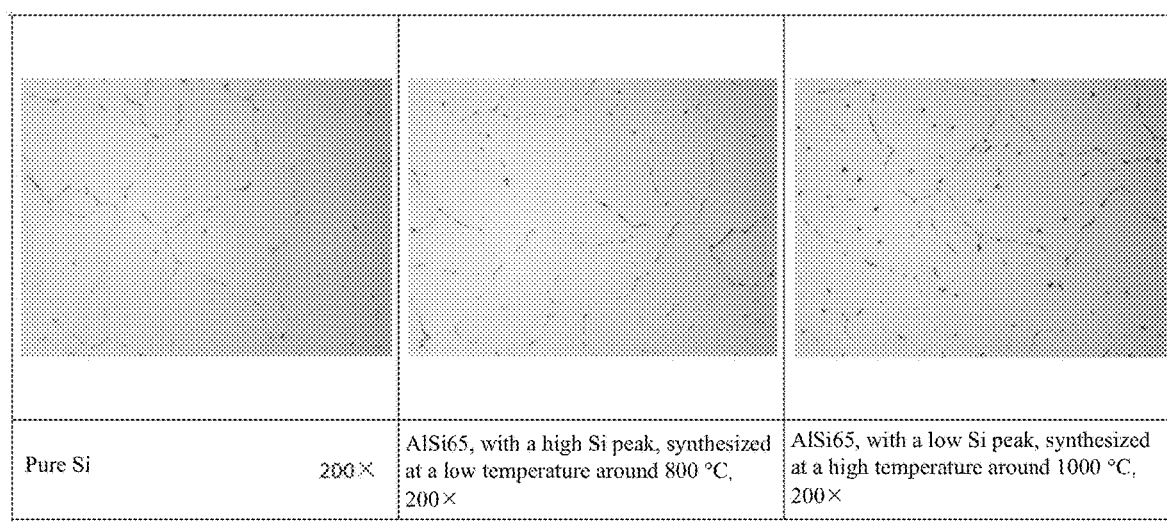
FIG. 14 is a metallographic diagram of AlSi65.
Figure 15:
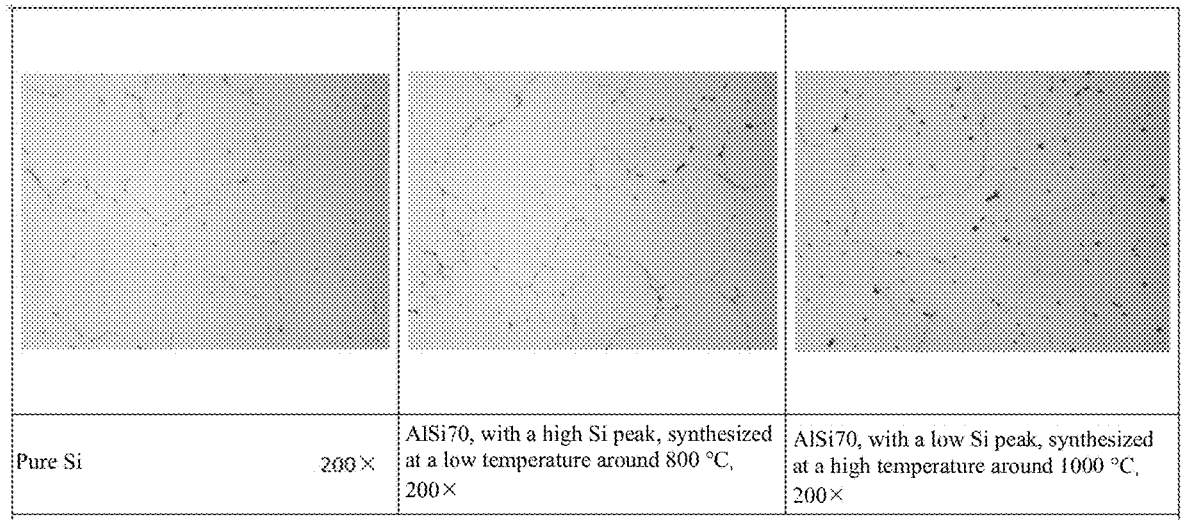
FIG. 15 is a metallographic diagram of AlSi70.

FIG. 1 is a diffraction pattern of AlSi55 at the time of primary heating, where the main phases are Si and Al9Si;

FIG. 2 is a diffraction pattern of AlSi55 at the time of secondary heating, where the main phases are Si and Al9Si;

FIG. 3 is a diffraction pattern of AlSi60 at the time of primary heating, where the main phases are Si and Al9Si;

FIG. 4 is a diffraction pattern of AlSi60 at the time of secondary heating, where the main phases are Si and Al9Si;

FIG. 5 is a diffraction pattern of AlSi65 at the time of primary heating, where the main phases are Si and Al9Si;

FIG. 6 is a diffraction pattern of AlSi65 at the time of secondary heating, where the main phases are Si and Al9Si;

FIG. 7 is a diffraction pattern of AlSi70 at the time of primary heating, where the main phases are Si and A19Si;

FIG. 8 is a diffraction pattern of AlSi70 at the time of secondary heating, where the main phases are Si and A19Si;

FIG. 9 is a diffraction pattern of AlSi75 at the time of primary heating, where the main phases are Si and A19Si;

FIG. 10 is a diffraction pattern of AlSi75 at the time of secondary heating, where the main phases are Si and A19Si;

FIG. 11 is a metallographic diagram of AlSi10;

FIG. 12 is a metallographic diagram of AlSi55;

FIG. 13 is a metallographic diagram of AlSi60;

FIG. 14 is a metallographic diagram of AlSi65;

FIG. 15 is a metallographic diagram of AlSi70; and

Figure 16:
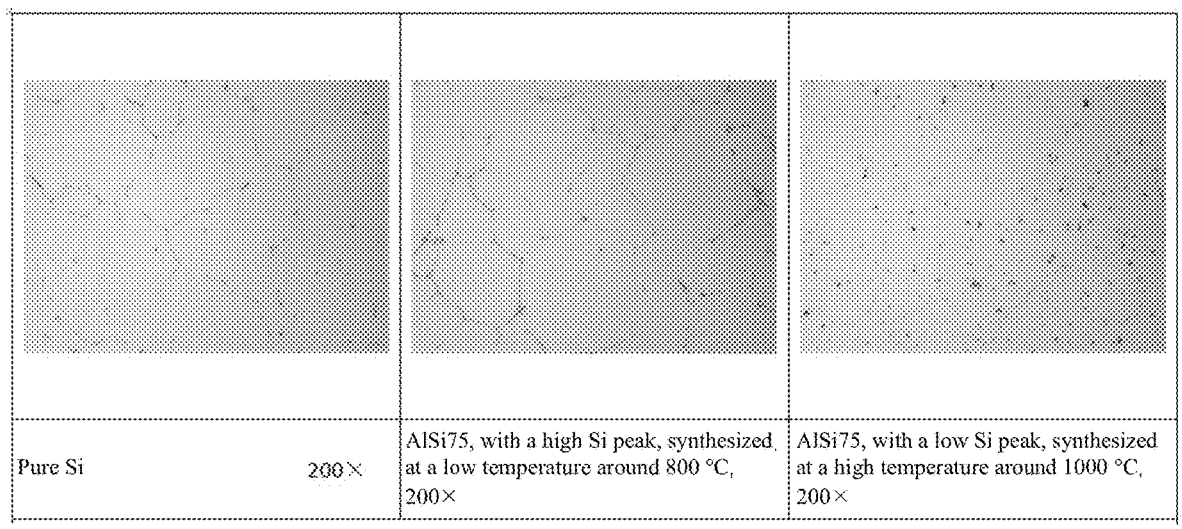
FIG. 16 is a metallographic diagram of AlSi75.

FIG. 16 is a metallographic diagram of AlSi75.

Compared with the current popular process using silicon element additives, the silicon-aluminum alloy of the invention achieves the prior full alloying of silicon and aluminum therein and overcomes the appearance of hypo-eutectic silicon phases that may occur in the currently popular production process of the aluminum-silicon alloy with a silicon content of 10% to 20% and the hereditary phenomenon in the processing of aluminum products.

In order to achieve the above objective, the invention further provides a preparation method of the silicon-aluminum alloy as described above.

Figure 17:
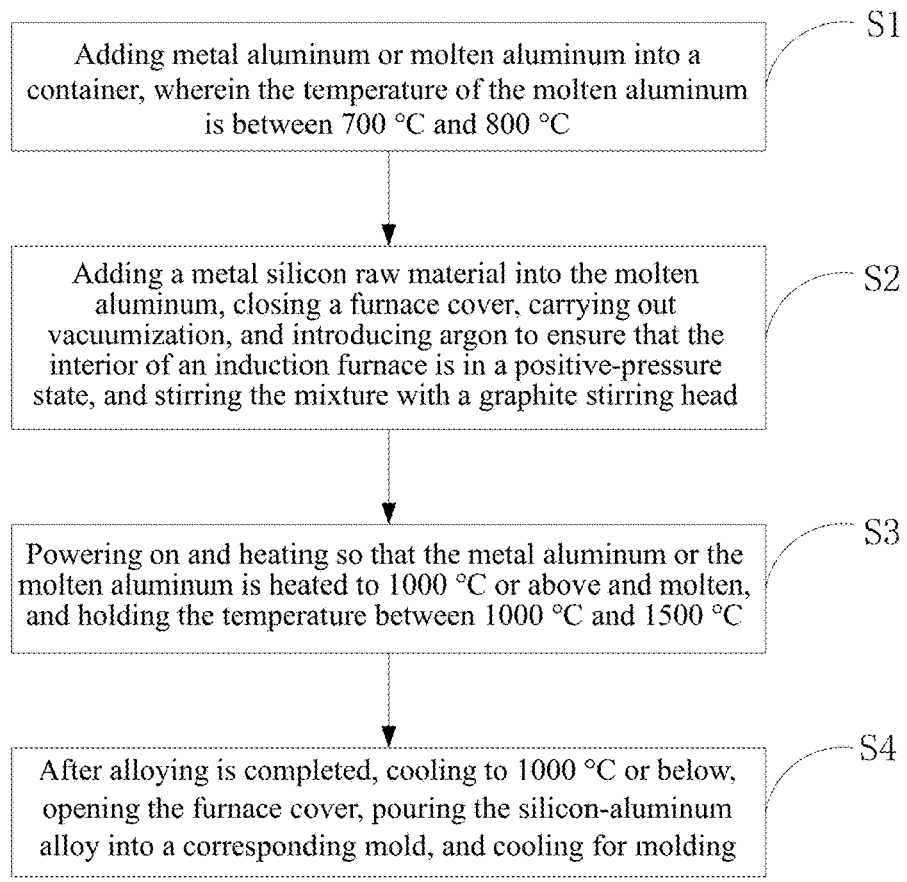
FIG. 17 is a schematic flow chart of a preferred embodiment of the preparation method of a silicon-aluminum alloy according to the invention.

Reference is made to FIG. 17. FIG. 17 is a schematic flow chart of a preferred embodiment of the preparation method of a silicon-aluminum alloy according to the invention.

As shown in FIG. 17, in this embodiment, the preparation method of a silicon-aluminum alloy includes the following steps.

In Step S1, metal aluminum or molten aluminum is added into a container, wherein the temperature of the molten aluminum is between 700° C. and 800° C.

Figure 18:
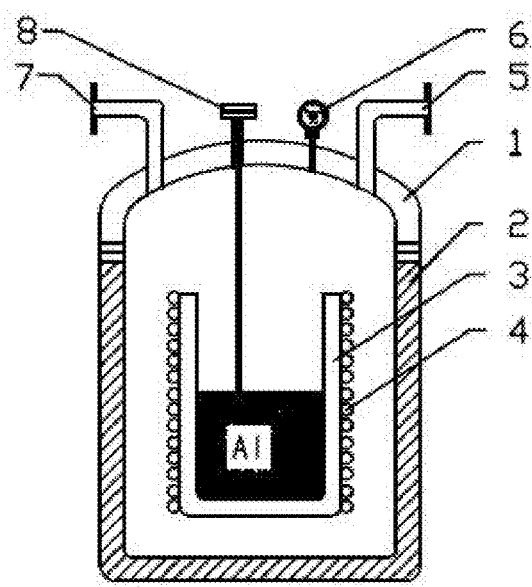
FIG. 18 is a schematic structural diagram of a magnetic induction furnace.

The container can be the crucible 3 placed in the magnetic induction furnace as shown in FIG. 18. The magnetic induction electric furnace includes a furnace cover 1, a magnetic induction furnace shell 2, a vacuumizing opening 5, a pressure measuring opening 6, an argon inlet 7, and a temperature measuring opening 8. The magnetic induction furnace shell 2 is made of an iron material. The outer periphery of the crucible 3 placed in the magnetic induction furnace is provided with a copper magnetic induction coil 4 (hollow, with cooling water inside). The crucible 3 can be a silicon carbide crucible, a graphite crucible, a clay crucible or a crucible for an induction furnace, made from other refractory materials formed by hammering ramming materials (such as quartz sand, magnesia, alumina, and the like) to hold the molten metal.

The frequency of the magnetic induction furnace can be selected from 800 Hz to 1200 Hz.

In other embodiments, the container can also be crucibles lined with different materials in a vacuum resistance furnace, or use other heating production processes where in a non-vacuum way, a suitable protective flux is selected to isolate the air.

In Step S2, a semi-metallic silicon raw material is added into the molten aluminum, the furnace cover is closed, vacuumization is carried out, and argon is introduced to ensure that the interior of a magnetic induction furnace is in a positive-pressure state, and the mixture is stirred with a graphite stirring head.

In Step S3, the furnace is powered on for heating the metal aluminum or the molten aluminum to 1000° C. or above, the metal aluminum or the molten aluminum is molten and the temperature is held between 1000° C. and 1500° C., and for example, it can be 1000° C., 1250° C., 1350° C. or 1500° C., wherein the metal aluminum and silicon form an intermetallic compound, i.e., the silicon-aluminum alloy, in this process and the time of the alloying process is between 30 min and 2 h.

The metal silicon raw material may be silicon powder, silicon flakes or silicon blocks, or a mixture of silicon powder, silicon flakes and silicon blocks.

In this embodiment, the time of stirring with the graphite stirring head may be set within a range of 30 min to 2 h according to actual needs, and for example, it can be 0.5 h, 1.25 h, or 2 h.

It can be understood that the time required for the entire alloying process is generally controlled within the range of 30 min to 2 h, which can ensure that metal silicon and aluminum form an intermetallic compound as much as possible, thus obtaining a qualified fully alloyed silicon-aluminum alloy and avoiding the generation of a small amount of metal oxides (silicon oxide or aluminum oxide).

In Step S4, after alloying is completed, the mixture is cooled to 1000° C. or below, the furnace cover is opened, and the silicon-aluminum alloy is then poured into a corresponding mold and cooled for molding.

In addition, as an implementation manner, subsequent to Step S4, the method may further include:

casting the silicon-aluminum alloy into amorphous blocks or flakes or mechanically breaking the silicon-aluminum alloy into a powder; and then accurately adding a calculated amount of the silicon-aluminum alloy as a silicon element additive to the smelting and preparation process of the aluminum alloy material. The silicon-aluminum alloy can be amorphous blocks, flakes or powder. Regardless of blocks, flakes or powder, their specifications can be restricted by formulating corresponding standards.

The aluminum alloy material is, for example, an aluminum alloy plate, tube or belt, or an aluminum-magnesium alloy, a cast aluminum wheel hub, or the like.

The beneficial effects of the silicon-aluminum alloy of the invention and its preparation method are as follows. Compared with the prior art, the invention achieves the prior full alloying of silicon and aluminum in the silicon-aluminum alloy and overcomes the appearance of hypo-eutectic silicon phases that may be produced during the production of the silicon-aluminum alloy with a silicon content of 10% to 20%) since silicon and aluminum in the silicon-aluminum alloy prepared according to the invention are fully alloyed.

The above description is set forth only as preferred embodiments of the invention and is not intended to limit the scope of the invention. Any equivalent structure or equivalent process transformation, made based on the contents of the description of the invention and the accompanying drawings and directly or indirectly used in other related technical fields, is likewise included within the scope of the patent protection of the invention.

What is claimed is:

1. A preparation method of a silicon-aluminum alloy, the preparation method comprising the following steps:

Step S1, adding metal aluminum or molten aluminum into a container, wherein the temperature of the molten aluminum is between 700° C. and 800° C.;

Step S2, adding a semi-metallic silicon raw material into the molten aluminum, closing a furnace cover, carrying out vacuumization, and introducing argon to ensure that the interior of a magnetic induction furnace is in a positive-pressure state, and stirring the aluminum metal or molten aluminum with a graphite stirring head;

Step S3, powering on and heating so that the aluminum metal or molten aluminum is heated to 1000° C. or above and molten, and holding the temperature between 1000° C. and 1500° C., wherein the metal aluminum and silicon mostly form an intermetallic compound in this process and the time of the alloying process is between 30 min and 2 h; and Step S4, after alloying is completed, cooling to 1000° C. or below, opening the furnace cover, pouring the silicon-aluminum alloy into a corresponding mold, and cooling for molding, wherein the silicon-aluminum alloy being molded comprises, by weight, 55% to 90% of silicon and the balance of aluminum and impurities.

2. The preparation method of the silicon-aluminum alloy according to claim 1, wherein the container is a crucible placed in the magnetic induction furnace, or a crucible placed in a vacuum resistance furnace, or a non-vacuum heatable container with a protective flux.

3. The preparation method of the silicon-aluminum alloy according to claim 2, wherein a frequency of the magnetic induction furnace ranges from 800 Hz to 1200 Hz.

4. The preparation method of the silicon-aluminum alloy according to claim 1, wherein the semi-metallic silicon raw material is silicon powder, silicon flakes, or amorphous silicon blocks or a mixture of silicon powder, silicon flakes and amorphous silicon blocks.

5. The preparation method according to claim 1, wherein in the Step S3, the time of stirring with the graphite stirring head is 30 min to 2 h.

6. The preparation method according to claim 1, subsequent to the Step S4, further comprising:

casting the silicon-aluminum alloy into various types of blocks or flakes or crushing the same into powders with different diameters as required, and adding the silicon-aluminum alloy as a silicon element additive to a smelting and preparation process of an aluminum alloy material to improve the physical properties of the produced aluminum product.

* * * * *